United States Patent
Monbaliu (10) Patent No.: US 11,964,526 B2
(45) Date of Patent: Apr. 23, 2024

(54) HEIGHT ADJUSTMENT ARRANGEMENT FOR AN AGRICULTURAL BALER

(71) Applicant: CNH Industrial America LLC, New Holland, PA (US)

(72) Inventor: Sven Monbaliu, Zuienkerke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/948,946

(22) Filed: Sep. 20, 2022

(65) Prior Publication Data

US 2023/0097429 A1    Mar. 30, 2023

(30) Foreign Application Priority Data

Sep. 20, 2021   (EP) .................................. 21197780

(51) Int. Cl.
| | |
|---|---|
| *B60G 17/015* | (2006.01) |
| *B60G 15/06* | (2006.01) |
| *B60G 17/016* | (2006.01) |
| *B60G 17/019* | (2006.01) |
| *A01F 15/04* | (2006.01) |

(52) U.S. Cl.
CPC ....... *B60G 17/0155* (2013.01); *B60G 15/067* (2013.01); *B60G 17/016* (2013.01); *B60G 17/019* (2013.01); *A01F 15/046* (2013.01)

(58) Field of Classification Search
CPC ............. B60G 17/0155; B60G 15/067; B60G 17/016; B60G 17/019; A01F 15/046
See application file for complete search history.

(56) References Cited

U.S. PATENT DOCUMENTS

| | | | |
|---|---|---|---|
| 6,378,276 B1 | 4/2002 | Dorge et al. | |
| 2010/0030425 A1 | 2/2010 | Holbrook et al. | |
| 2018/0272824 A1* | 9/2018 | Kerner | B60G 17/0155 |
| 2018/0281545 A1 | 10/2018 | Kerner et al. | |
| 2019/0168562 A1* | 6/2019 | Rathke | B66C 9/12 |
| 2020/0047580 A1* | 2/2020 | Coombs | B60G 17/0526 |
| 2020/0122540 A1 | 4/2020 | Rife, Jr. et al. | |
| 2020/0238782 A1* | 7/2020 | Vaughan | F15B 1/08 |
| 2021/0114428 A1 | 4/2021 | Demon et al. | |

(Continued)

OTHER PUBLICATIONS

Extended European Search Report for EP Application No. 21197780.6 dated Mar. 18, 2022 (9 pages).

*Primary Examiner* — Toan C To (74) *Attorney, Agent, or Firm* — Peter K. Zacharias; Rebecca L. Henkel; Rickard K. DeMille (57) ABSTRACT

An agricultural baler includes a hydraulic circuit with a first hydraulic cylinder connected between the first end of the first axle and the chassis, and a second hydraulic cylinder connected between the second end of the first axle and the chassis. At least one sensor senses a position of the chassis relative to the first axle. An electrical processing circuit is coupled with the hydraulic circuit and the at least one sensor. The electrical processing circuit controls operation of the hydraulic circuit, and includes an operator input device for selectively: 1) raising the chassis of the baler relative to the first axle, 2) lowering the chassis of the baler relative to the first axle, or 3) automatically returning the chassis of the baler to a predetermined operating height relative to the first axle, dependent upon an output signal from the at least one sensor.

13 Claims, 6 Drawing Sheets

(56) References Cited

U.S. PATENT DOCUMENTS

| | | | |
|---|---|---|---|
| 2021/0231134 A1* | 7/2021 | Schlenker | B60G 21/067 |
| 2021/0231138 A1* | 7/2021 | Engelmann | E01C 23/088 |
| 2021/0362557 A1* | 11/2021 | Stahl | B60G 17/0152 |

* cited by examiner

HEIGHT ADJUSTMENT ARRANGEMENT FOR AN AGRICULTURAL BALER

FIELD OF THE INVENTION

The present invention relates to agricultural balers, and, more particularly, to axle arrangements used with such balers.

BACKGROUND OF THE INVENTION

Agricultural balers are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a feeding channel (also known as a "pre-compression chamber"). The packer unit forms a wad of crop within the feeding channel which is then transferred to a main bale chamber. (For purposes of discussion, the charge of crop material within the feeding channel will be termed a "wad", and the charge of crop material after being compressed within the main bale chamber will be termed a "flake"). Typically such a packer unit includes packer tines or forks to move the crop material from the pickup unit into the feeding channel. Instead of a packer unit it is also known to use a rotorary cutter unit which chops the crop material into smaller pieces.

A stuffer unit transfers the wad of crop material in charges from the feeding channel to the main bale chamber. Typically such a stuffer unit includes stuffer forks which are used to move the wad of crop material from the feeding channel to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

U.S. patent application Ser. No. 17/252,538, which has been published as U.S. Patent Pub. No. 20210114428, and which has been assigned to the assignee of the present invention, discloses an axle arrangement for an agricultural baler having tandem axles which are pivotally coupled with the baler frame. For each axle, a pair of hydraulic cylinders are interconnected between the baler frame and a respective end of the axle to raise and lower the axle to a desired height. An operator must manually measure and adjust the height of the axle to the desire height. Such manual adjustment of the axle height can be tedious.

SUMMARY OF THE INVENTION

The present invention provides an agricultural baler which can be manually raised or lowered relative to the chassis, or automatically returned to a predetermined operating height, using an operator input device.

The invention in one embodiment is directed to an agricultural baler including a chassis and a main bale chamber. An axle arrangement includes a first axle having a first end and a second end. A hydraulic circuit includes a first hydraulic cylinder connected between the first end of the first axle and the chassis, and a second hydraulic cylinder connected between the second end of the first axle and the chassis. At least one sensor senses a position of the chassis relative to the first axle. An electrical processing circuit is coupled with the hydraulic circuit and the at least one sensor. The electrical processing circuit is configured to control operation of the hydraulic circuit. The electrical processing circuit includes an operator input device for selectively providing the functionality of:
1) raising the chassis of the baler relative to the first axle,
2) lowering the chassis of the baler relative to the first axle, or
3) automatically returning the chassis of the baler to a predetermined operating height relative to the first axle, dependent upon an output signal from the at least one sensor.

In another embodiment of the invention, the at least one sensor includes a pair of sensors, with a first sensor being positioned in association with the first end of the first axle, and a second sensor being positioned in association with the second end of the first axle, each of the sensors being in the form of an angular orientation sensor, a linear position sensor, or a proximity sensor.

In another embodiment of the invention, a first leaf spring interconnects the chassis with the first end of the first axle, and a second leaf spring interconnects the chassis with the second end of the first axle. Each of the first leaf spring and the second leaf spring are pivotally coupled with the chassis.

In another embodiment of the invention, the first sensor is in the form of an angular orientation sensor that is positioned at the connection between the first leaf spring and the chassis, and the second sensor is in the form of an angular orientation sensor that is positioned at the connection between the second leaf spring and the chassis.

In another embodiment of the invention, a first endless belt is carried by the chassis and the first end of the first axle, and a second endless belt is carried by the chassis and the second end of the first axle. The first sensor measures an angular orientation of the first endless belt relative to the chassis, and the second sensor measures an angular orientation of the second endless belt relative to the chassis.

In another embodiment of the invention, the first sensor includes a swing arm that engages the first endless belt, and the second sensor includes a swing arm that engages the second endless belt. The first sensor and the second sensor each provide an output signal that is dependent upon a position of the respective swing arm.

In another embodiment of the invention, the electrical processing circuit automatically returns the chassis of the baler to the predetermined operating height, dependent upon output signals from the first sensor and the second sensor.

In another embodiment of the invention, each of the leaf springs is a generally horizontally arranged leaf spring.

In another embodiment of the invention, the first hydraulic cylinder and the second hydraulic cylinder are generally vertically arranged suspension cylinders.

In another embodiment of the invention, the operator input device is located on the agricultural baler or remotely located on a traction unit pulling the agricultural baler.

In yet another embodiment of the invention, the operator input device comprises a touch screen or manually depressible buttons.

In a further embodiment of the invention, the electrical processing circuit includes an electronic control unit (ECU) located on the agricultural baler and a vehicle control unit (VCU) located on the traction unit. The operator input device includes manually depressible push buttons which are coupled with the ECU on the agricultural baler.

In a further embodiment, the electrical processing circuit includes an ECU located on the agricultural baler and a VCU located on the traction unit. The operator input device includes a touch screen with virtual buttons. The touch screen is coupled with the VCU on the traction unit.

In yet another embodiment of the invention, the axle arrangement includes a second axle having a first end and a second end.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Figure 1:
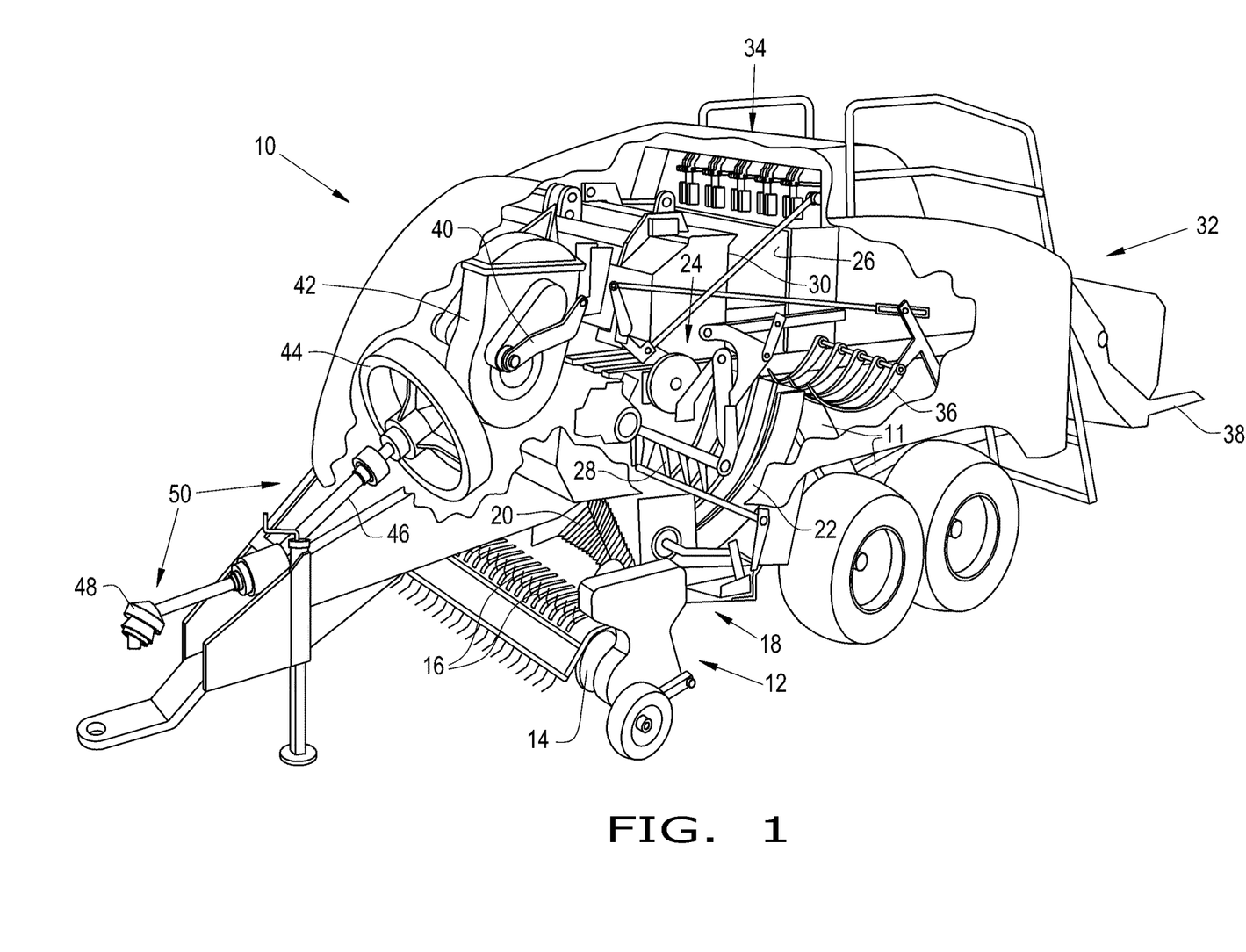
FIG. 1 is a perspective cutaway view showing the internal workings of a large square baler, which can include an axle arrangement of the present invention.

Referring now to the drawings, and more particularly to FIG. 1, there is shown a perspective cutaway view showing the internal workings of a large square baler 10. Baler 10 includes a chassis 11 carrying a number of baler components (described below), and operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a feeding channel 22 to form a wad of crop material. The packer tines 20 intertwine the crop together and pack the crop within the feeding channel 22. Feeding channel 22 and packer tines 20 function as the first stage for crop compression. Once the pressure in the feeding channel 22 reaches a predetermined sensed value, a stuffer unit 24 moves the wad of crop from the feeding channel 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit 52, such as a tractor (not shown in FIG. 1, but shown schematically in FIG. 8). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit.

Referring now to FIGS. 2-6, the baler 10 includes an axle arrangement 60 coupled with the chassis 11. The axle arrangement 60 can be configured as a tandem axle arrangement including a first axle 62, a second axle 64 and a hydraulic circuit 66 associated with each of the first axle 62 and second axle 64. The first axle 62 can be configured as a front axle, and the second axle 64 can be configured as a rear axle, or vice versa. In the event that the baler 10 is configured with more than two axles, the first axle 62 and second axle 64 can be differently configured, such as a front axle and middle axle, etc.

Figure 2:
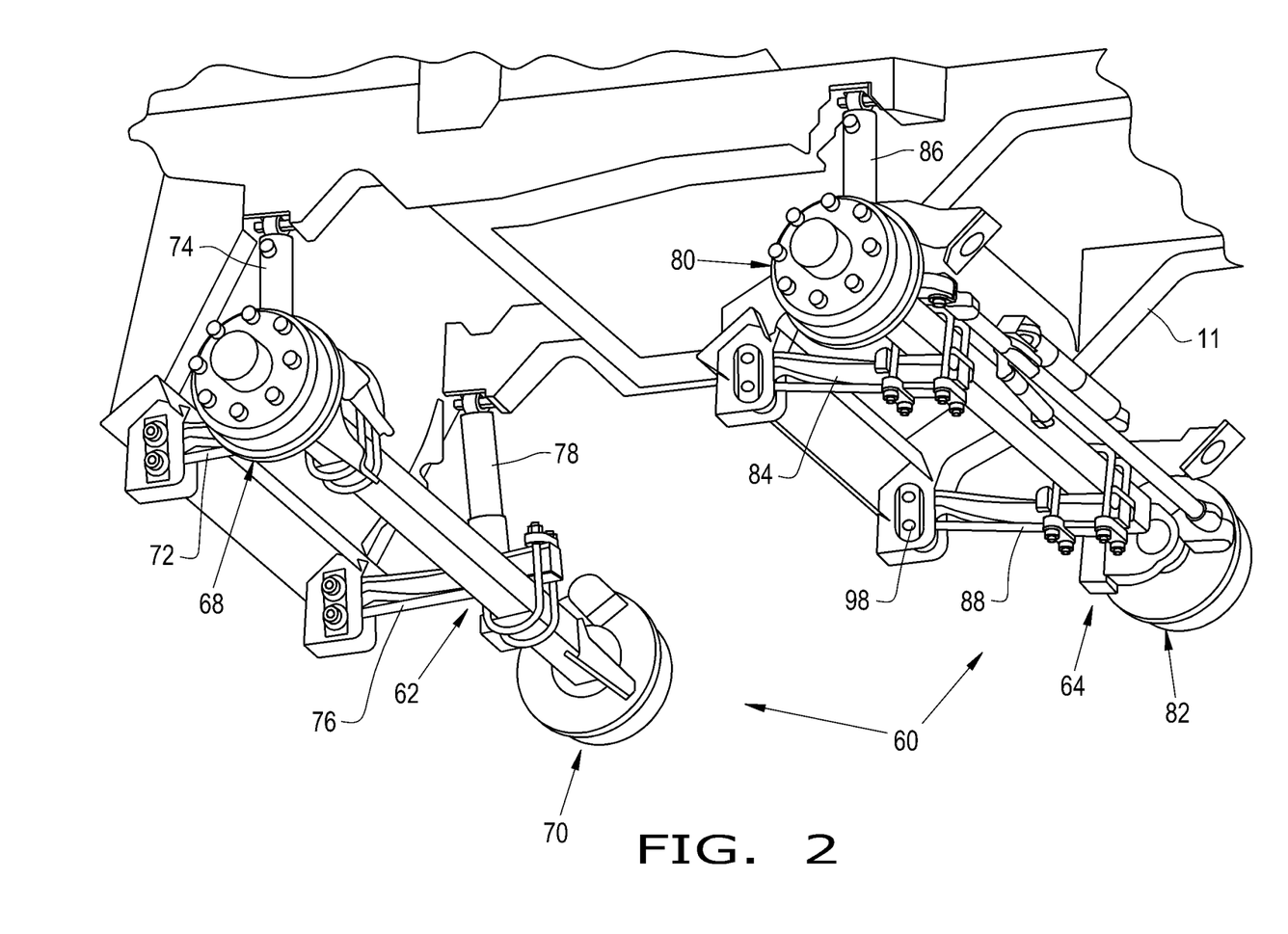
FIG. 2 is a simplified perspective bottom view showing an embodiment of the axle arrangement of the present invention, which can be used on the baler shown in FIG. 1.
Figure 3:
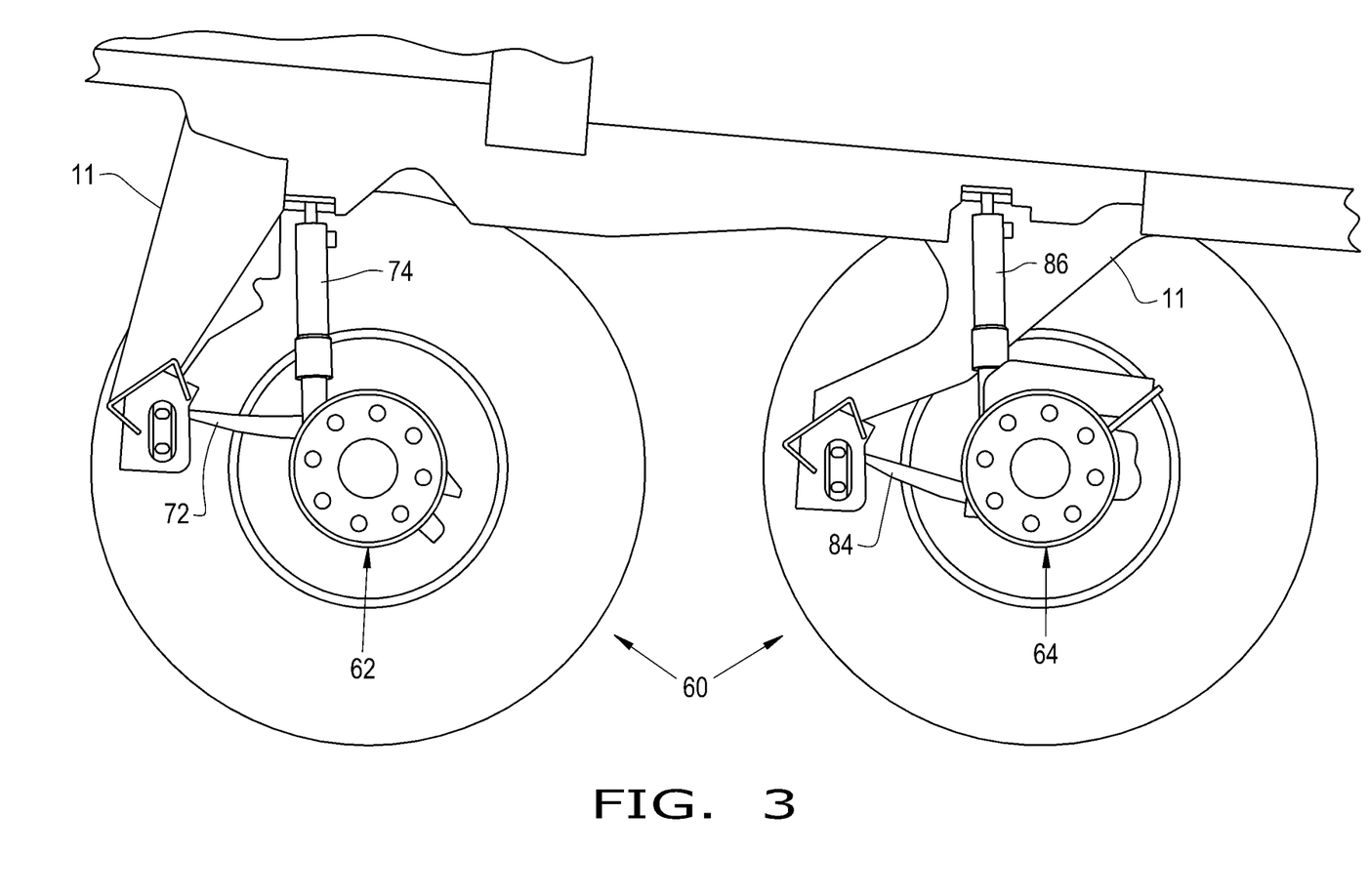
FIG. 3 is a simplified end view of the axle arrangement shown in FIG. 2.

The first axle 62 includes a first end 68 and a second end 70 (FIG. 2). The first end 68 is coupled with the chassis 11 by a first leaf spring 72 and a generally vertically arranged first hydraulic cylinder 74. The second end 70 is coupled with the chassis 11 by a second leaf spring 76 and a generally vertically arranged second hydraulic cylinder 78. The hydraulic cylinders 74 and 68 act as suspension cylinders between the chassis 11 and the first axle 62.

The second axle 64 includes a first end 80 and a second end 82. The first end 80 is coupled with the chassis 11 by a first leaf spring 84 and a generally vertically arranged first hydraulic cylinder 86. The second end 82 is coupled with the chassis 11 by a second leaf spring 88 and a generally vertically arranged second hydraulic cylinder 90.

Each leaf spring 72, 76 on the first axle 62, and each leaf spring 84, 88 on the second axle 64, can be generally horizontally arranged leaf springs as shown. It may be possible in other applications, however, to arrange the leaf springs other than horizontally. Moreover, in the embodiment of the invention shown in the drawings, each of the leaf springs provide lateral stabilization of the respective first axle 62 or second axle 64. It may be possible in other applications, however, to provide the lateral support with other structure, such as a tie rod extending between the chassis 11 and the respective first or second axle 62, 64.

The hydraulic circuit 66 (FIGS. 2, 3 and 8) includes the hydraulic cylinders 74, 78 on the first axle 62, and the hydraulic cylinders 86, 90 on the second axle 64. The hydraulic circuit 66 may also include electro-hydraulic valves 92 which are respectively associated with each of the hydraulic cylinders 74, 78, 86 and 90. The electro-hydraulic valves 92 can in known fashion allow the cylinders to be selectively operated as double action cylinders for selective movement of the ram in either direction.

Referring now to FIGS. 4-8, the axle arrangement 60 can also include one or more sensors 94 and an electrical processing circuit 96. The sensors 94 are used to sense a position of the chassis 11 relative to the first axle 62 and/or second axle 64. For purposes of brevity, the sensors 94 will only be discussed with reference to the first or front axle 62. However, it is to be understood that the sensors 94 associated with the second or rear axle 64 can be configured and function substantially similar.

The one or more sensors 94 can include a pair of sensors, with a first sensor 94A positioned in association with the first end 68 of the first axle 62, and a second sensor 94B positioned in association with the second end 70 of the first axle 62. Each of the sensors 94A, 94B can be in the form of an angular orientation sensor, as indicated by the circular double-headed arrow within the sensor. Alternatively, the sensors 94 can be differently configured, such as a linear position sensor, proximity sensor, or other suitable sensor providing an output signal which can be used to sense a position of the chassis 11 relative to the first axle 62.

Figure 4:
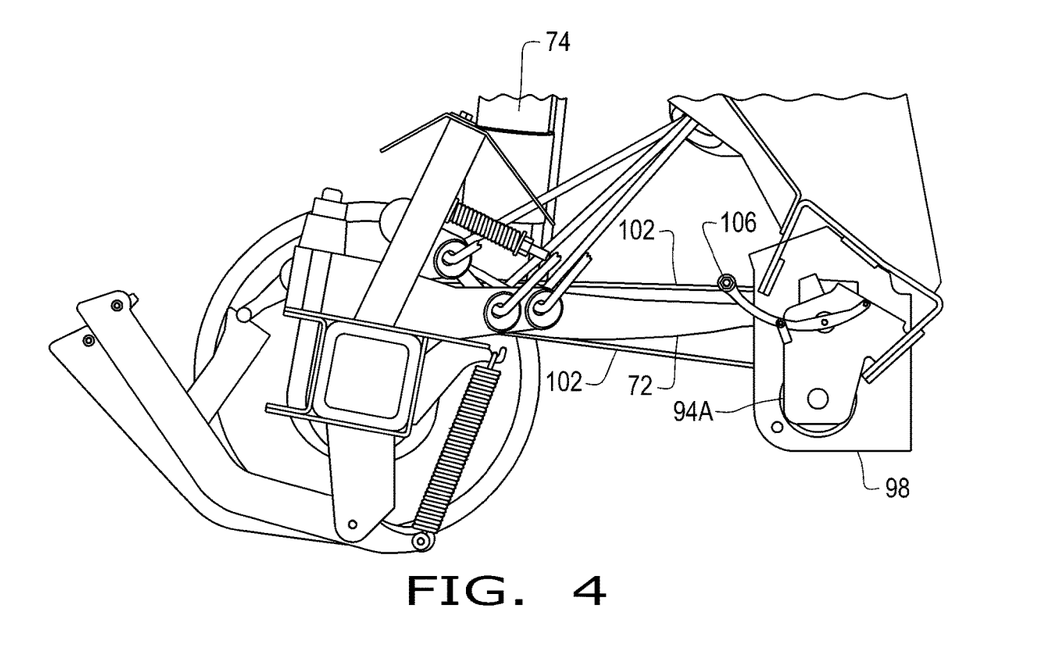
FIGS. 4 and 5 are opposite end views of the axle arrangement shown in FIGS. 2 and 3.
Figure 5:
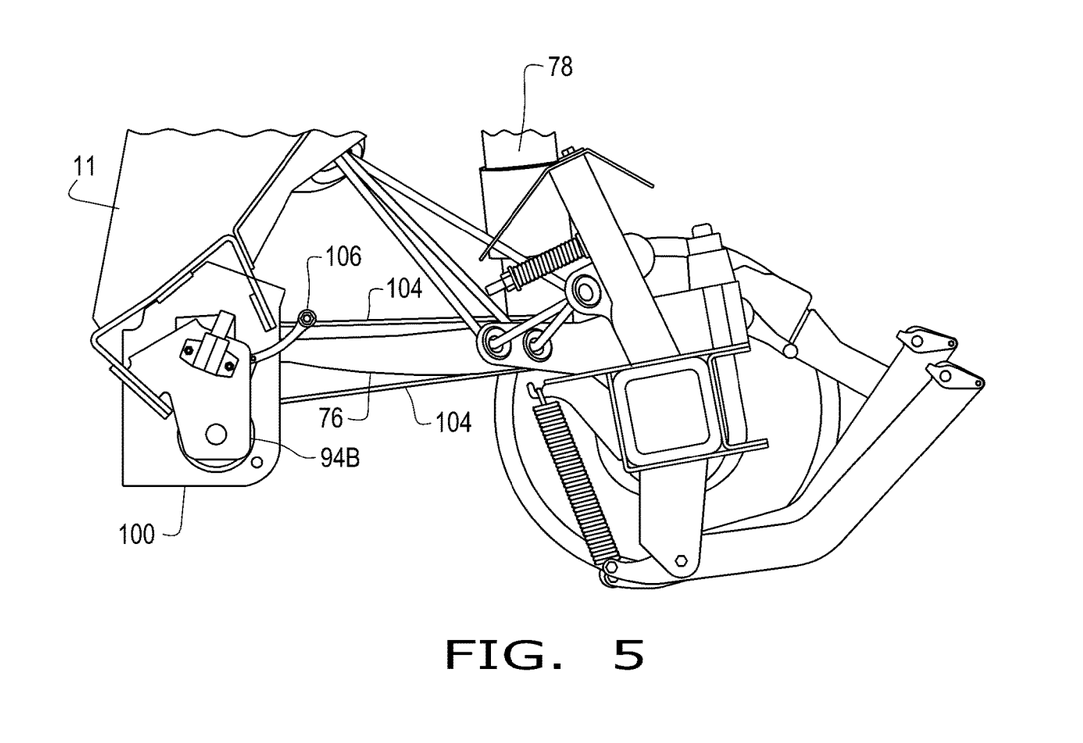

When configured as an angular orientation sensor, the sensors 94A, 94B can be positioned in association with the connection points between the first and second leaf springs 72, 76 and the chassis 11. Referring to FIGS. 4 and 5, the first sensor 94A can be positioned at an inboard end of a bracket 98 which carries the first leaf spring 72. Similarly, the second sensor 94B can be positioned at an inboard end of a bracket 100 which carries the second leaf spring 76.

Figure 6:
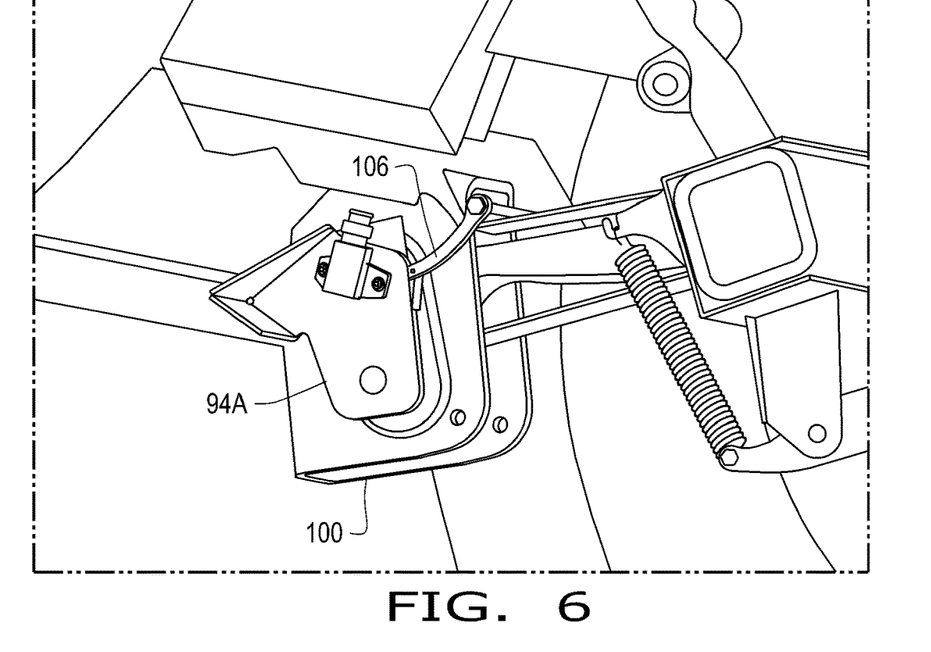
FIGS. 6 and 7 are partial perspective views of the axle arrangement shown in FIGS. 2-4, illustrating an embodiment of a sensor for sensing a position of the axle arrangement.
Figure 7:
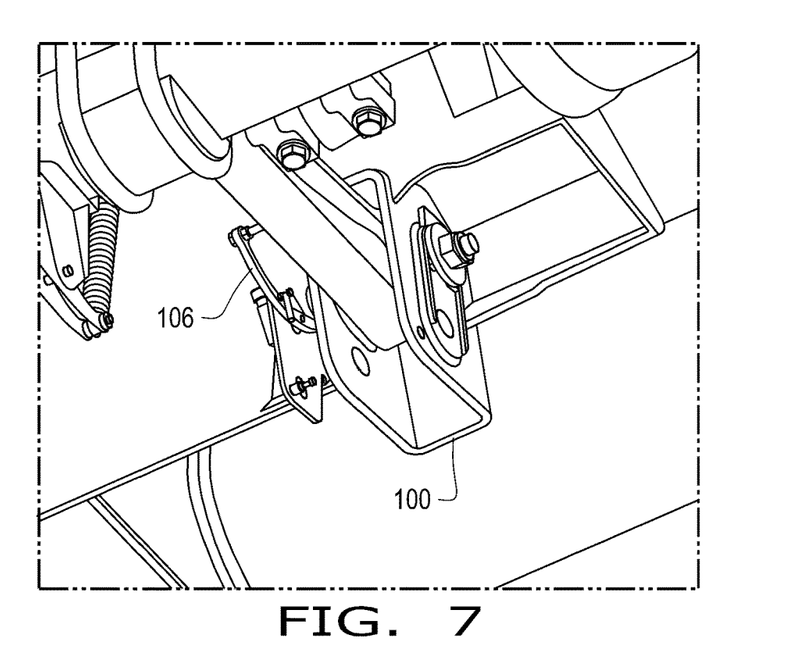

A first endless belt 102 is carried by the chassis 11 and the first end 68 of the first axle 62. A second endless belt 104 is carried by the chassis 11 and the second end 70 of the first axle 62. The first sensor 94A measures an angular orientation of the first endless belt 102 relative to the chassis 11, and the second sensor 94B measures an angular orientation of the second endless belt 104 relative to the chassis 11. More particularly, the first sensor 94A includes a swing arm 106 that engages the first endless belt 102, and the second sensor 94B likewise includes a swing arm 106 that engages the second endless belt 104. The first sensor 94A and the second sensor 94B each provide an output signal that is dependent upon an angular position of the respective swing arm 106.

Figure 8:
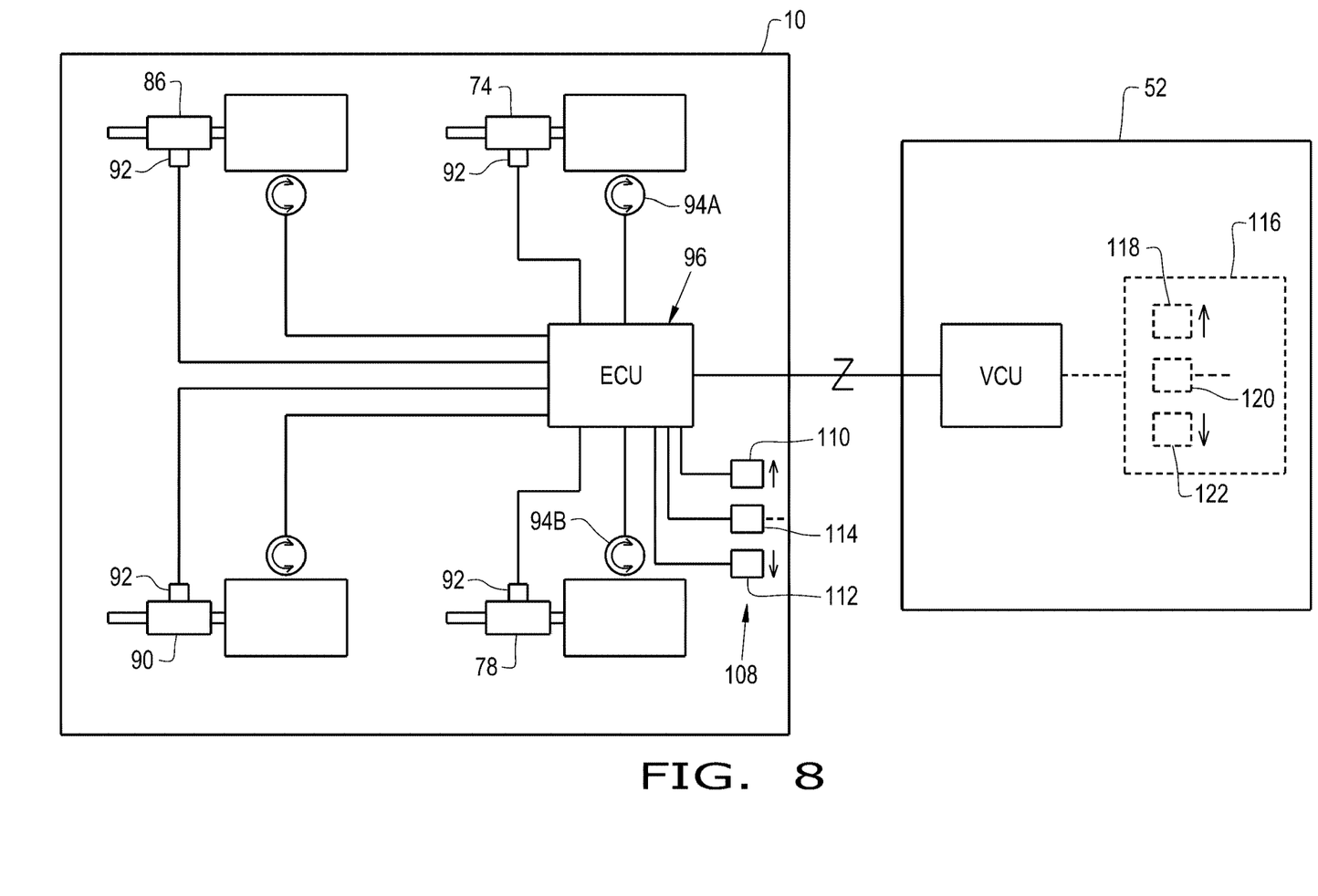
FIG. 8 is a block diagram of an embodiment of a controller which can be used with the axle arrangement of the present invention.

The electrical processing circuit 96 is coupled with the hydraulic circuit 66 (by way of the electro-hydraulic valves 92) and the at least one sensor 94A, 94B. The electrical processing circuit 96 can be configured to control operation of the hydraulic circuit 66. The electrical processing circuit 96 includes an operator input device 108 for selectively providing the functionality of:

1) raising the chassis 11 of the baler 10 relative to the first axle 62,
2) lowering the chassis 11 of the baler 10 relative to the first axle 62, or
3) automatically returning the chassis 11 of the baler 10 to a predetermined operating height relative to the first axle 62, dependent upon one or more output signals from the at least one sensor 94A, 94B.

The electrical processing circuit 96 can be located onboard the agricultural baler 10 and/or the traction unit 52. In the embodiment shown, the agricultural baler 10 includes an onboard ECU and the operator input device 108 is configured as three manually depressible push buttons 110, 112 and 114 which are located toward the front of the baler 10 and coupled with the ECU on the agricultural baler. An operator at the front of the baler 10 can raise the chassis 11 by pressing button 110. For example, the chassis can be raised for maintenance or repair purposes allowing an operator to slide under the baler 10. An operator can lower the chassis 11 to a desired height by depressing the button 112. Buttons 110 and 112 can also optionally be used to raise or lower the chassis 11 to a desired operating height, and then that operating height can be set using a predetermined sequence (such as holding button 114 for a preset amount of time (e.g., 6 seconds)). Button 114 can be depressed to automatically return the chassis 11 to the predetermined operating height.

In the embodiment illustrated in FIG. 8, the ECU is shown as being detachably connected via an electrical plug or the like to a VCU located with the traction unit/tractor 52. In another embodiment, as illustrated by the dashed lines, the operator input device 108 can be located inside the operator cab of the traction unit 52, and the operator can operate the operator input device 108 from within the operator cab. For example, the operator input device 108 can optionally be in the form of an LCD touch screen 116 with virtual buttons 118, 120 and 122. Virtual buttons 118, 120 and 122 can operate similarly to buttons 110, 112, and 114, as described above.

During operation of the baler 10, crop is fed via the feeding channel 22 into the main bale chamber 26. The plunger 30 reciprocates back and forth during compression cycles within the main bale chamber 26 to produce bales which are ejected from the rear of the baler 10. Depending on the configuration of the baler 10, operating conditions of the crop and/or terrain, need for repair of maintenance, etc., an operator may desire to raise or lower the baler 10 using the operator input device 108. The selected height can then be set as a new predetermined operating height, or the baler may be automatically returned to a previously predetermined operating height, using the button 114 of the operator input device 108.

In the embodiment shown and described above, the axle arrangement 60 is in the form of a tandem axle arrangement, including the first axle 62 and the second axle 64. The first axle 62 is configured as the front axle, and the second axle 64 is configured as the rear axle. However, it may be possible to configure the axle arrangement of the present invention with more than two axles. For example, it may be possible to configure the axle arrangement of the present invention with 3 axles, with the third axle also coupled to the chassis 11. Thus, the concepts of the present invention can be extended to an axle arrangement with two or more axles.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
    a chassis;
    a main bale chamber;
    an axle arrangement including a first axle having a first end and a second end;
    a hydraulic circuit including a first hydraulic cylinder connected between the first end of the first axle and the chassis, and a second hydraulic cylinder connected between the second end of the first axle and the chassis;
    at least one sensor for sensing a position of the chassis relative to the first axle; and
    an electrical processing circuit coupled with the hydraulic circuit and the at least one sensor, the electrical processing circuit configured to control operation of the hydraulic circuit, the electrical processing circuit including an operator input device for selectively:
        raising the chassis of the baler relative to the first axle,
        lowering the chassis of the baler relative to the first axle, or
        automatically returning the chassis to a predetermined operating height relative to the first axle, dependent upon an output signal from the at least one sensor.

2. The agricultural baler of claim 1, wherein the at least one sensor comprises a pair of sensors, including a first sensor positioned in association with the first end of the first axle, and a second sensor positioned in association with the second end of the first axle, each of the first sensor and the second sensor comprising:
    an angular orientation sensor;
    a linear position sensor; or
    a proximity sensor.

3. The agricultural baler of claim 2, further comprising a first leaf spring which interconnects the chassis with the first end of the first axle, and a second leaf spring which interconnects the chassis with the second end of the first axle, each of the first leaf spring and the second leaf spring being pivotally coupled with the chassis,
    wherein the first sensor comprises an angular orientation sensor that is positioned at the connection between the first leaf spring and the chassis, and the second sensor comprises an angular orientation sensor that is positioned at the connection between the second leaf spring and the chassis.

4. The agricultural baler of claim 3, further comprising a first endless belt carried by the chassis and the first end of the first axle, and a second endless belt carried by the chassis and the second end of the first axle, and wherein the first sensor measures an angular orientation of the first endless belt relative to the chassis, and the second sensor measures an angular orientation of the second endless belt relative to the chassis.

5. The agricultural baler of claim 4, wherein the first sensor includes a swing arm that engages the first endless belt, and the second sensor includes a swing arm that engages the second endless belt, and wherein each of the first sensor and the second sensor provides an output signal that is dependent upon a position of a respective swing arm.

6. The agricultural baler of claim 3, wherein each of the first leaf spring and the second leaf spring is a generally horizontally arranged leaf spring.

7. The agricultural baler of claim 2, wherein the electrical processing circuit is for automatically returning the chassis of the baler to the predetermined operating height, dependent upon output signals from the first sensor and the second sensor.

8. The agricultural baler of claim 1, wherein the first hydraulic cylinder and the second hydraulic cylinder each comprises a generally vertically arranged suspension cylinder.

9. The agricultural baler of claim 1, wherein the operator input device is located on the agricultural baler or remotely located on a traction unit pulling the agricultural baler.

10. The agricultural baler of claim 9, wherein the operator input device comprises a touch screen or manually depressible buttons.

11. The agricultural baler of claim 10, wherein the electrical processing circuit includes an electronic control unit located on the agricultural baler and a vehicle control unit located on the traction unit, and wherein the operator input device includes manually depressible push buttons which are coupled with the electronic control unit on the agricultural baler.

12. The agricultural baler of claim 10, wherein the electrical processing circuit includes an electronic control unit located on the agricultural baler and a vehicle control unit located on the traction unit, and wherein the operator input device includes a touch screen with virtual buttons, the touch screen being coupled with the vehicle control unit on the traction unit.

13. The agricultural baler of claim 1, wherein the axle arrangement further includes a second axle having a first end and a second end.

* * * * *